United States Patent [19]
Schmid

[11] 3,980,219
[45] Sept. 14, 1976

[54] SOLDER BATH APPARATUS

[75] Inventor: Hans Schmid, Ruschlikon, Switzerland

[73] Assignee: Meteor AG, Ruschlikon, Switzerland

[22] Filed: Apr. 16, 1975

[21] Appl. No.: 568,656

[30] Foreign Application Priority Data
Apr. 19, 1974 Switzerland.......................... 5422/74

[52] U.S. Cl..................................... 228/34; 228/36
[51] Int. Cl.²........................ B23K 1/00; B23K 1/08
[58] Field of Search ................... 228/34, 36, 40, 33, 228/39; 118/422

[56]     References Cited
         UNITED STATES PATENTS
2,771,047  10/1956  Zimmerman..................... 228/34 X
2,857,878  10/1958  Matson et al.......................... 228/34

Primary Examiner—Al Lawrence Smith
Assistant Examiner—Margaret Joyce
Attorney, Agent, or Firm—Cushman, Darby & Cushman

[57]            ABSTRACT

A vessel for containing molten solder has a cover movable by a drive so as alternately to uncover and cover the molten slag in the vessel. A slag stripper is also movable by the drive during uncovering movement of the lid to remove slag skin from the molten solder.

6 Claims, 1 Drawing Figure

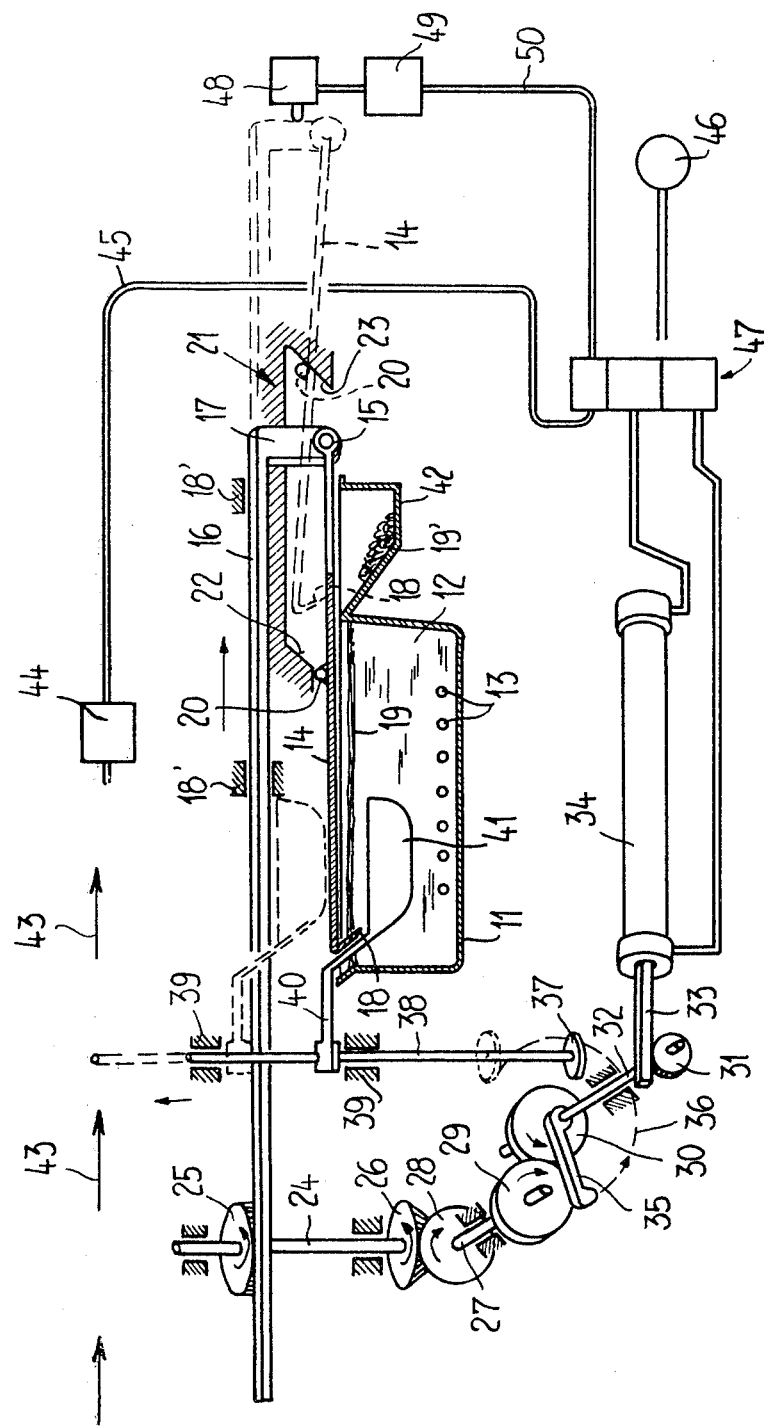

SOLDER BATH APPARATUS

BACKGROUND OF THE INVENTION

1. Field of the Invention

The invention relates to a solder bath apparatus comprising a vessel for melted solder and a slag stripper which is movable across the surface of the molten solder.

2. Description of the Prior Art

In known solder bath apparatus a heated vessel containing the solder is usually round, in particular of annular construction, and is driven by means of a drive so as to rotate slowly about its axis. The molten solder naturally also rotates with the vessel. In the known apparatus the slag stripper is stationary and extends over the level of the moving melt, the oxide skin formed thereon and referred to hereinbelow as slag skin being continually built up against the slag stripper and being displaced thereby, and by the onfollowing slag skin, beyond the rotating vessel edge into an overflow trough. As seen in the direction of motion of the melt, there is always one place in the known apparatus in which the level of the molten solder is free of slag and this place is therefore suitable for the immersion of objects which are to be soldered.

However, such apparatus suffers from different disadvantages.

To begin with, the vessel containing the molten solder requires a much larger area compared to the area of the place which is suitable for the immersion of the objects. It is a consequence of this substantial area that the vessel must always contain a substantial quantity of molten solder if a useful immersion depth is to be achieved. This also calls for increased heating power so that the molten solder is always maintained at the desired temperature.

Secondly, part of the level of the molten solder in the known apparatus is constantly kept free of the slag skin, i.e. it is quasi-"swept clean" and is therefore exposed directly to the ambient air even if a workpiece is not to be immediately immersed into the solder. This not only accelerates the renewal of the slag skin and therefore a loss of solder material, but at this place also removes from the molten solder the thermal insulating effect which is inherent in the slag skin. As already mentioned, this results in unnecessary loss of solder due to oxidation and heat loss of the molten solder due to convection, such heat loss having to be compensated by an increased heat input into the vessel heating system.

Thirdly, the constant build-up and subsequent displacement of the slag skin into the overflow trough in the known apparatus involves the risk that the displaced slag skin also discharges liquid solder into the overflow trough so that the solder is lost.

SUMMARY

An object of the invention is to provide apparatus which substantially avoids the previously-mentioned disadvantages.

The present invention provides solder bath apparatus comprising a vessel for containing molten solder, a movable cover for the vessel, alternating drive means for moving the lid alternately to uncover and cover the vessel, and a slag stripper movable by said drive means during uncovering movement of said lid to remove slag skin from the molten solder.

In this way it is not only possible to reduce the size of the vessel containing the molten solder in comparison with the vessels of known apparatus, but the vessel may be fixed resulting in a substantial simplification of the construction and a reduction of the technological expenditure.

Preferably, the apparatus further comprises time drive means for periodically supplying and positioning successive workpieces to be soldered, and means for actuating said alternating drive means when a workpiece is positioned by said time drive means for producing an uncovering and covering movement of said lid.

An embodiment of the invention will now be described with reference to a solder bath system shown diagrammatically by way of example in the accompanying drawing.

DESCRIPTION OF THE PREFERRED EMBODIMENT

In the drawing the solder bath system shown is intended for use as a supplementary unit in an automatic transfer line, for example for use with an automatic coil-winding machine of carousel construction for winding electric coils for soldering coil ends to connecting tags. The solder bath system comprises a trough-shaped vessel 11, fixedly maintained by means (not shown) and containing molten solder 12. The melt 12 is maintained at the desired temperature by heating elements 13, which are disposed in the vessel and are shown only diagrammatically. The vessel 11, and therefore the molten solder 12, is covered by a lid 14 when the system is in the position shown in solid lines. The end of the lid 14 which appears on the right in the drawing is hinged by means of a friction joint 15 to a bearing eye 17, which is constructed or formed on one end of a push rod 16. The push rod 16 is supported in guides 18' so as to be longitudinally slidable but non-rotatable therein.

The other end of the lid 14 remote from the joint 15 is bent downwardly over its entire width, i.e. towards the vessel 11, the bent part of the lid 14 forming a stripper 18 the free end edge of which penetrates slightly into the melt 12 and penetrates the slag skin 19 which floats on the melt.

A follower 20, which extends at right-angles to the plane of the drawing beyond one side edge of the lid 14 and engages thereat in a slotted link 21, is also mounted on the lid 14. The essential elements of the slotted link 21 comprise two oppositely-inclined surfaces 22, 23 which are situated at a distance from each other corresponding approximately to the length of the vessel 11. The end of the push rod 16 on the left-hand side of the drawing is constructed as a rack, and a gearwheel 25 mounted on a shaft 24 meshes with the rack. A bevel gear 26 which meshes with a bevel gear 28 mounted on a horizontal shaft 27 is also mounted on the shaft 24. A further gearwheel 29 is mounted on the reduction shaft 27, and in turn meshes with a further gearwheel 30, which is mounted on a shaft 32 which also supports a pinion 31. The pinion 31 meshes with a piston rod which is connected as rack 33 and is associated with a pneumatic or hydraulic cylinder 34.

Furthermore, a rocker 35 is keyed on the shaft 32, the free end of the rocker 35 co-operating with a stop abutment plate 37 in the course of its path of motion designated by the numeral 36. The stop abutment plate 37 is mounted at the bottom end of a vertical push rod 38. An arm 40 is mounted on the push rod 38 which is supported in bearings 39 so as to be longitudinally slidable but non-rotatable. One end of the arm 40 supports a ladle 41, which extends into the vessel 11 and therefore into the molten solder 12.

In the above-described arrangement the piston rod 33, constructed as a rack, moves to the left when the pneumatic cylinder 34 is actuated. This results in a displacement of the push rod 16 to the right as indicated by the arrows on the wheels 30, 29, 28, 26 and 25, as well as on the push rod 16. As a result the lid 14 is slid to the right to expose the level of the molten solder 12. In the course of its displacement to the right the stripper 18, which moves with the lid 14, removes the slag skin 19, which floats on the level of the molten solder 12. Towards the end of the displacement the follower 20 meets the inclined surface 23 of the slotted link 21 with the result that the lid 14 is raised above the edge of the vessel 11 by means of a pivoting motion about the friction joint 15, so that the stripper 18 is positioned above the opening of a vessel 42 which adjoins the vessel 11. In this position, shown in broken lines in the drawing, the slag skin entrained by the stripper 18 will drop by virtue of its own dead weight into the vessel 42, as indicated by reference 19'.

Immediately prior to the end of the movement of the lid 14 the rocker 35 meets the stop abutment plate 37 and in the course of its further motion raises the plate 37 and therefore also the push rod 38. As a result, the ladle 41 is also raised until it reaches the position shown in broken lines in the drawing. The workpiece to be soldered can then be immersed into the ladle 41 or into the melt which is disposed therein and is free of any slag skin. When the cylinder 34 is actuated in the opposite direction, the operations described above will take place in reverse.

As already mentioned, the illustrated apparatus is intended as a unit for incorporation into an operating station of a transfer line. It may be assumed that workpieces, not shown, are supplied individually and correctly positioned to the illustrated apparatus in the sense of the arrows 43 by a timing drive (not shown). The end of one driving cycle of the timing drive is detected by a limit switch 44 which in turn controls a valve 47 connected between a pressure source 46 and the cylinder 34 by means of a first control line. The end of the exposing stroke of the lid 14 is detected by a further limit switch 48 which also controls the valve 47, for example by means of a delay member 49 and through a second control line 50. The delay member 49 is adjusted so that the opening time is just sufficient for the desired soldering operation. A further limit switch, adapted to detect the end of the return movement of the push rod 16, can be provided if desired so that the timing drive can again be switched on.

MODIFICATIONS

A crank drive can be provided in place of the illustrated rack drive for driving the lid 14 and the stripper 18. It is not essential that the stripper 18 is constructed integrally with the lid 14. It is merely essential that the stripper 18 is operated in synchronism with the lid.

I claim:

1. Solder bath apparatus comprising an open vessel for containing molten solder, a movable lid for covering said vessel, drive means for sliding said lid between an uncovered and covered position relative to said vessel in a plane that is substantially parallel to the surface of the molten solder in said vessel, a slag stripper fixed to said lid to be movable therewith and depending rigidly therefrom to extend at least partially into said molten solder so that said slag stripper will remove slag skin from the surface of the molten solder when said lid is moved from said covered to said uncovered position relative to said vessel, a ladle, ladle carrying means actuatable by said drive means for carrying said ladle into said vessel and the molten solder therein upon each movement of said lid to said covered position and out of said vessel upon each movement of said lid to said uncovered position.

2. Apparatus according to claim 1, wherein said slag stripper is mounted on an edge of said lid, said edge being a trailing edge during uncovering movement of said lid.

3. Apparatus according to claim 2, further comprising means for raising said lid away from said vessel towards the end of said uncovering movement and for lowering said lid onto the vessel towards the end of said covering movement of said lid.

4. Apparatus according to claim 3, wherein the length of said uncovering movement of said lid is greater than the length of said vessel whereby said slag stripper moves clear of the vessel during said uncovering movement, and a collecting vessel is arranged adjacent said vessel for collecting slag removed by said slag stripper during said uncovering movement of said lid.

5. Apparatus according to claim 3, wherein said lid is hingedly attached to a reciprocatingly drivable push rod, said lid having a follower engageable with stationary means for pivoting the lid.

6. Apparatus according to claim 1, comprising time drive means for periodically supplying and positioning successive workpieces to be soldered, and means for actuating said drive means when a workpiece is positioned by said time drive means for producing an uncovering and covering movement of said lid.

* * * * *